United States Patent
Ross

(10) Patent No.: US 10,419,796 B2
(45) Date of Patent: Sep. 17, 2019

(54) BROADBAND BACKUP TO SATELLITE-BASED SET-TOP BOXES

(71) Applicant: THE DIRECTV GROUP, INC., El Segundo, CA (US)

(72) Inventor: Nicholas Ross, Coconut Grove, FL (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/447,171

(22) Filed: Mar. 2, 2017

(65) Prior Publication Data
US 2018/0255338 A1    Sep. 6, 2018

(51) Int. Cl.
*H04N 21/262*    (2011.01)
*H04N 21/2543*    (2011.01)
(Continued)

(52) U.S. Cl.
CPC ... *H04N 21/26225* (2013.01); *H04N 21/2543* (2013.01); *H04N 21/44209* (2013.01);
(Continued)

(58) Field of Classification Search
CPC ......... H04N 21/26225; H04N 21/2543; H04N 21/44209; H04N 21/4821; H04N 21/6125;
(Continued)

(56) References Cited

U.S. PATENT DOCUMENTS

| | | | |
|---|---|---|---|
| 6,993,044 B2 * | 1/2006 | McKinnon, III | H04N 21/2408 370/468 |
| 7,124,426 B1 * | 10/2006 | Tsuria | H04N 21/2146 725/75 |

(Continued)

FOREIGN PATENT DOCUMENTS

| | | |
|---|---|---|
| EP | 1919125 B1 | 9/2009 |
| WO | 0119079 A9 | 8/2002 |

(Continued)

OTHER PUBLICATIONS

Arberg, "Network infrastructure for IPTV", Ericsson Review No. 3, 2007, 79-83.

(Continued)

*Primary Examiner* — Randy A Flynn
(74) *Attorney, Agent, or Firm* — Guntin & Gust, PLC; Antanu Das

(57) ABSTRACT

Aspects of the subject disclosure may include, for example, a method that includes receiving a satellite signal, measuring a quality of the satellite signal, determining whether the quality of the satellite signal falls below a threshold, determining a scheduled content of the satellite signal being viewed responsive to determining the quality of the satellite signal falls below the threshold, obtaining the scheduled content through a network connection as a replacement scheduled content responsive to determining the quality of the satellite signal falls below the threshold, presenting the replacement scheduled content in place of the scheduled (Continued)

content from the satellite signal, monitoring the quality of the satellite signal during the presenting of the replacement channel, and presenting the scheduled content from the satellite signal responsive to the monitoring detecting a satisfactory quality of the satellite signal over a predetermined period of time. Other embodiments are disclosed.

20 Claims, 6 Drawing Sheets

(51) Int. Cl.
*H04N 21/442* (2011.01)
*H04N 21/482* (2011.01)
*H04N 21/61* (2011.01)

(52) U.S. Cl.
CPC ..... *H04N 21/4821* (2013.01); *H04N 21/6125* (2013.01); *H04N 21/6131* (2013.01); *H04N 21/6143* (2013.01); *H04N 21/6193* (2013.01)

(58) Field of Classification Search
CPC ........... H04N 21/6131; H04N 21/6143; H04N 21/6193
See application file for complete search history.

(56) References Cited

U.S. PATENT DOCUMENTS

| | | | |
|---|---|---|---|
| 8,191,095 B2 | 5/2012 | Briggs et al. | |
| 8,589,992 B2 | 11/2013 | Babic et al. | |
| 8,792,336 B2 | 7/2014 | Barroso et al. | |
| 8,799,446 B2 | 8/2014 | Watson et al. | |
| 8,811,155 B2 | 8/2014 | Weber et al. | |
| 8,824,989 B2 | 9/2014 | Sotelo et al. | |
| 8,854,948 B2 | 10/2014 | Wu et al. | |
| 9,031,568 B2* | 5/2015 | Karaoguz | H04N 21/4126 455/452.2 |
| 9,037,109 B1* | 5/2015 | Singh | H04W 4/24 455/406 |
| 9,344,751 B1 | 5/2016 | Ream et al. | |
| 9,438,745 B2 | 9/2016 | Adimatyam et al. | |
| 9,485,469 B2 | 11/2016 | Klauss et al. | |
| 9,510,060 B1 | 11/2016 | Arya | |
| 2002/0154892 A1 | 10/2002 | Hoshen | |
| 2004/0143850 A1* | 7/2004 | Costa | H04N 21/2181 725/115 |
| 2004/0221305 A1* | 11/2004 | Broussard | H04N 21/2543 725/38 |
| 2004/0226045 A1* | 11/2004 | Nadarajah | H04N 21/2385 725/97 |
| 2007/0130581 A1* | 6/2007 | Del Sesto | H04N 21/235 725/36 |
| 2007/0239879 A1 | 10/2007 | Serbest et al. | |
| 2007/0255829 A1 | 11/2007 | Pecus et al. | |
| 2009/0178058 A1* | 7/2009 | Stillwell, III | H04L 67/322 719/317 |
| 2009/0193482 A1* | 7/2009 | White | H04N 21/44209 725/110 |
| 2010/0138531 A1 | 6/2010 | Kashyap et al. | |
| 2011/0149753 A1* | 6/2011 | Bapst | H04H 20/22 370/252 |
| 2012/0110630 A1* | 5/2012 | Golobrodsky | H04N 21/4882 725/110 |
| 2013/0074127 A1* | 3/2013 | Kotecha | H04N 21/84 725/54 |
| 2014/0313989 A1* | 10/2014 | Doken | H04N 21/64769 370/329 |
| 2015/0019465 A1* | 1/2015 | Littlejohn | H04N 21/44209 706/12 |
| 2015/0039680 A1* | 2/2015 | Gallant | H04N 21/25435 709/203 |
| 2015/0040172 A1* | 2/2015 | Zelesko | H04N 21/4622 725/110 |
| 2015/0326920 A1* | 11/2015 | Dhanabalan | H04N 21/2383 725/90 |
| 2016/0006649 A1 | 1/2016 | Chiang | |
| 2016/0021424 A1* | 1/2016 | Andersson | H04N 21/4383 725/110 |
| 2016/0157209 A1* | 6/2016 | Baldwin | H04N 21/6131 370/216 |
| 2016/0191913 A1* | 6/2016 | Martch | H04N 21/6543 348/189 |
| 2016/0277776 A1 | 9/2016 | Park | |
| 2016/0337426 A1 | 11/2016 | Shribman | |

FOREIGN PATENT DOCUMENTS

| | | |
|---|---|---|
| WO | 02071705 A1 | 9/2002 |
| WO | 2006107883 A3 | 4/2007 |
| WO | 2010046722 A1 | 4/2010 |
| WO | 2015144850 | 10/2015 |

OTHER PUBLICATIONS

Doverspike, "Designing a reliable IPTV network", IEEE Internet Computing, May/Jun. 2009, 15-22.

Unknown, "Satellite as a Backup or Failover", WN Business, wirelessnation.co.nz, Jan. 22, 2016, 1-2.

\* cited by examiner

100

300

BROADBAND BACKUP TO SATELLITE-BASED SET-TOP BOXES

FIELD OF THE DISCLOSURE

The subject disclosure relates to a broadband backup to satellite based media content processors.

BACKGROUND

Satellite based media processors receive media content signals from a satellite system through a satellite receiver.

BRIEF DESCRIPTION OF THE DRAWINGS

Reference will now be made to the accompanying drawings, which are not necessarily drawn to scale, and wherein.

DETAILED DESCRIPTION

Figure 1:
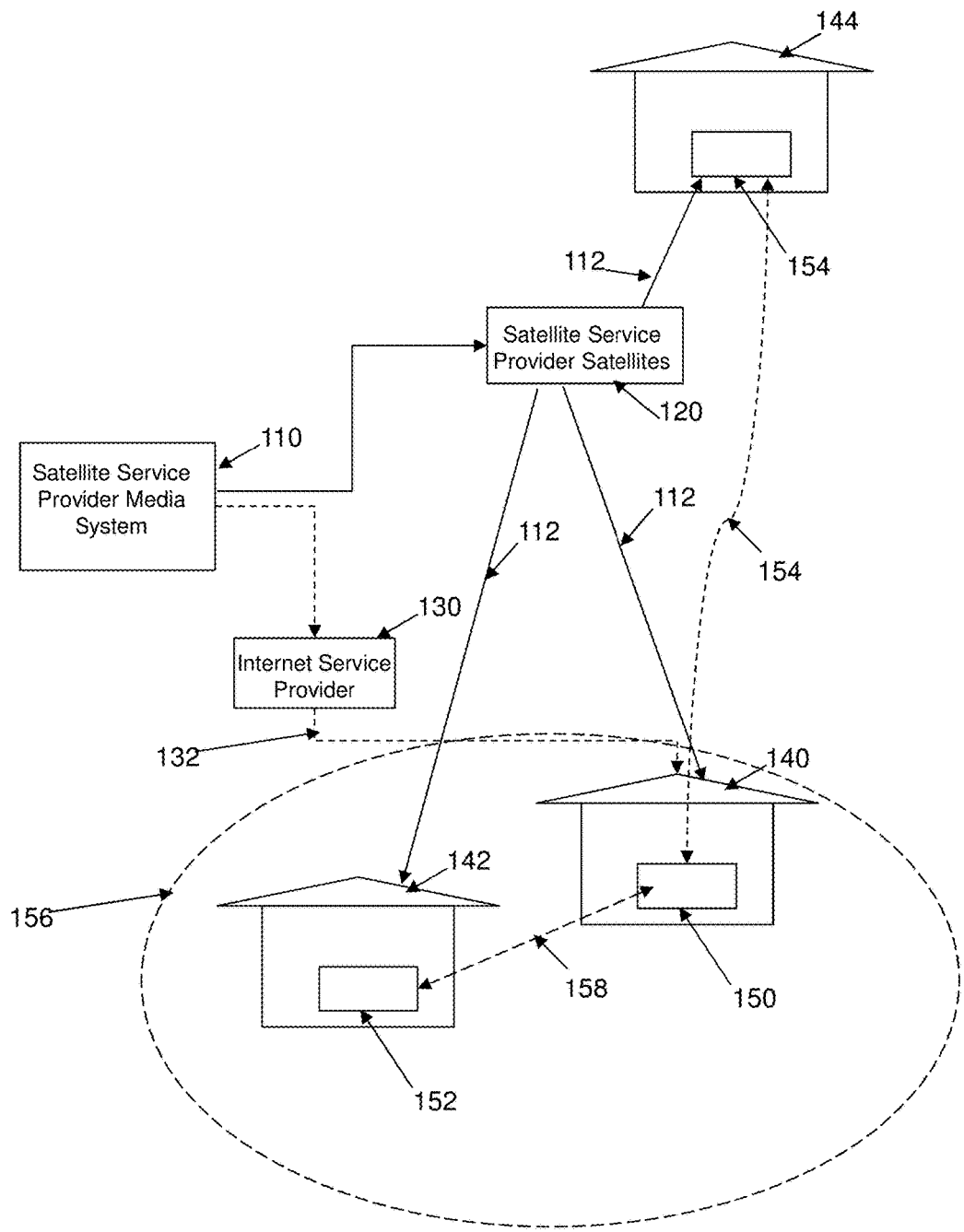
FIG. 1 depicts an illustrative embodiment of satellite system 100.

The subject disclosure describes, among other things, illustrative embodiments for providing an adaptive backup to satellite based communications systems and media content providers. The systems can exemplarily return to use of the satellite network once the satellite signal is stable. Other embodiments are described in the subject disclosure.

One or more aspects of the subject disclosure include a method that includes receiving, by a processing system including a processor, a satellite signal, measuring, by the processing system, a quality of the satellite signal, determining, by the processing system, whether the quality of the satellite signal falls below a threshold, determining, by the processing system, a scheduled content of the satellite signal being viewed responsive to determining the quality of the satellite signal falls below the threshold, obtaining, by the processing system, the scheduled content through a network connection as a replacement scheduled content responsive to determining the quality of the satellite signal falls below the threshold, presenting, by the processing system, the replacement scheduled content in place of the scheduled content from the satellite signal, monitoring, by the processing system, the quality of the satellite signal during the presenting of the replacement channel, and presenting, by the processing system, the scheduled content from the satellite signal responsive to the monitoring detecting a satisfactory quality of the satellite signal over a predetermined period of time.

One or more aspects of the subject disclosure include a media processor that includes a processing system including a processor and a memory that stores executable instructions that, when executed by the processing system, facilitate performance of operations, that includes receiving an Internet connection, receiving a satellite signal that includes media content, presenting a channel from the satellite signal on a display device, identifying a channel identity for the channel, identifying a replacement channel for the channel available through the Internet connection, monitoring a quality of the channel as provided by the satellite signal, determining the quality of the channel is below a minimum channel quality threshold, obtaining the replacement channel through the Internet connection responsive to determining the quality of the satellite signal is below the minimum channel quality threshold, and presenting the replacement channel in place of the channel from the satellite signal on the display device while the quality of the channel is below the minimum channel quality threshold.

One or more aspects of the subject disclosure include a machine-readable storage medium, comprising executable instructions that, when executed by a processing system including a processor, facilitate performance of operations including providing a satellite signal that includes media content to a media processor, wherein the satellite signal includes a plurality of channels containing media content and electronic programming guide information, receiving an indication that a channel of the plurality of channels is being accessed by the media processor, identifying a channel identity for the channel, identifying a replacement channel for the channel available through a network connection of the media processor, monitoring a quality of the channel that the media processor receives, determining the quality of the channel is below a minimum channel quality threshold, and providing the replacement channel through the network connection responsive to determining the quality of the channel is below the minimum channel quality threshold, wherein the media processor presents the replacement channel in place of the channel from the satellite signal while the quality of the channel is below the minimum channel quality threshold.

FIG. 1 depicts an illustrative embodiment of adaptive satellite network 100. Exemplarily, an adaptive satellite media content system 100 can provide satellite based media content to a subscriber household 140. Exemplarily, the subscriber household 140 has a set-top box 150, or media processor, which receives satellite signals through a satellite dish (not pictured) associated with the subscriber household 140. In some embodiments, the adaptive satellite media content system 100 includes a satellite service provider media system 110 which can provide media content as well as other content and services, including Internet service and electronic program guide information, through satellites 120 over a satellite connection 112 to the set top box 150. In some embodiments, disruptions in the satellite signal 112 can be accounted for by momentarily backing up the delivery of media content through an Internet connection 132 through an Internet Service Provider 130. Exemplarily, the Internet Service Provider 130 can retrieve or access the media content from the satellite service provider media system 110.

Exemplarily, the adaptive satellite network 100 can provide the subscriber household 140 with media content during a service disruption. Service disruptions for some satellite service providers can occur when there is a blockage of the satellite signal 112 due to weather events, satellite dish malfunction, or other blockage events. In some embodiments, the system can retrieve broadcast media content through a household Internet connection, an open internet wireless connection, or through a cellular network that includes Internet connectivity. Exemplarily, the set top box 150 can be connected to a network, such as a wireless network or a wired LAN cable. In other embodiments, the set top box 150 can scan for available wireless networks through a router. In other embodiments, the set top box 150 can scan for local wireless communication devices or cellular connections to find cellular based Internet connectivity.

Exemplarily, the adaptive satellite network 100 can include decisions steps as to when to switch between Internet based media content and satellite based media content so as to avoid frequent "flip-flopping" between the Internet and satellite sources. In some examples, the adaptive satellite network 100 may wait for a predetermined amount of time before switching back to satellite based content. In other examples, the adaptive satellite network 100 may rely on weather reports to indicate that a storm, or other weather event, has bypassed the subscriber household 140. In some embodiments, the weather reports can be presented to the subscriber in addition to notices that the satellite signal has been interrupted.

In some embodiments, the subscriber household 140 can determine if there is a potential business relationship between the satellite service provider 110 and the Internet Service Provider 130. In some instances, this may result in a coordination between the satellite service provider 110 and the Internet Service Provider 130. For example, reduced billing rates may be applied for Internet bandwidth consumed during the satellite signal outage. In other examples, the user's Internet capability for the subscriber household 140 can be increased during the satellite service outage. In additional embodiments, the Internet Service Provider 130 can be alerted of the satellite service outage so as to prepare additional bandwidth capacity to handle the additional load of downloading the media content.

Figure 2:
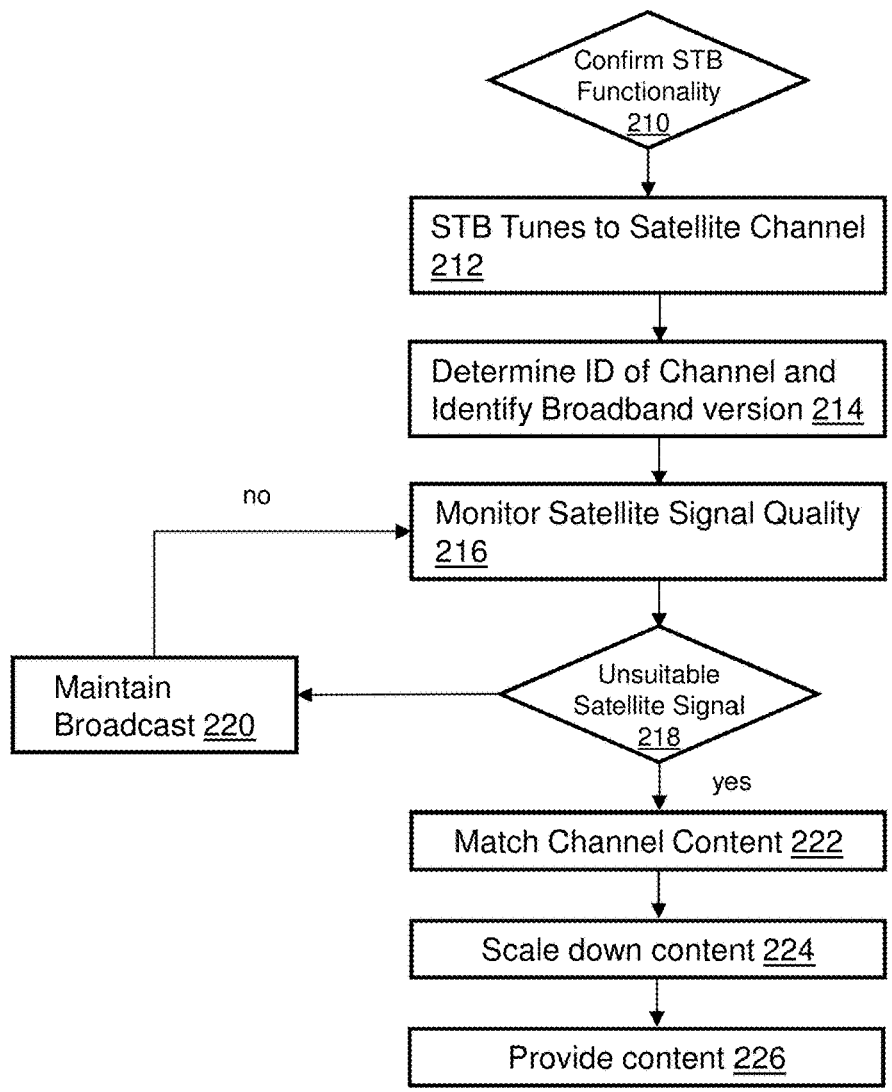
FIG. 2 depicts an illustrative embodiment of a method used in portions of the system described in FIG. 1.

FIG. 2 depicts an illustrative embodiment of a method used by adaptive satellite network 100. Method 200 can include Step 210 in which set top box functionality is confirmed. For example, regular status reports can be presented that indicate proper functioning of the device. The set top box status can indicate a subscription is up to date and paid for by the subscriber household 140 for set top box 150. During the regular operation of the set top box, the set top box will receive instructions from either the user or from a digital video recorder to tune to channels as indicated by Step 212. Exemplarily, in Step 214, the identification the channel can be determined and the satellite service provider's broadband version of that channel can be located. Exemplarily, the satellite service provider 110 has a digital version of media content and media content information available to be streamed through an Internet Service Provider. In some embodiments, the satellite service provider media system 110 can simply digitize the broadcast media content as it is provided to provide an available online stream. Exemplarily, the satellite service provider's set top boxes can then retrieve this online stream as needed.

In Step 216, the quality of the satellite signal is monitored. The quality of the whole satellite signal can be monitored or a portion of the satellite signal related to the selected channel can be monitored. In Step 218, the monitored satellite signal quality can be measured to ensure that an acceptable satellite signal is being received. For example, if the satellite signal quality is above an acceptable threshold, in Step 220, the broadcast is maintained and method 200 returns to the monitoring of Step 216. If the satellite signal quality is found to be below the acceptable threshold, then in Step 222, the channel can be matched with the available online media content as, for example, previously identified in Step 214. Exemplarily, the scheduled content that is broadcast can be identified and replacement scheduled content can be retrieved and provided.

Once the matching available online media content is found, the matching available online media content can be scaled as appropriate in Step 224. For example, the bandwidth of the Internet connection may be considered. In some instances, the available bandwidth may only support a lower download load and thus a lower resolution may be requested. In some instances, certain satellite signal content such as media content information, an electronic programming guide, or other additional services provided along with the media content may be modified, minimized, or eliminated so as to reduce load on the Internet connection. Exemplarily, once the replacement scheduled content is received, the content can be provided, in Step 226, to a display device associated with the set top box.

Figure 3:
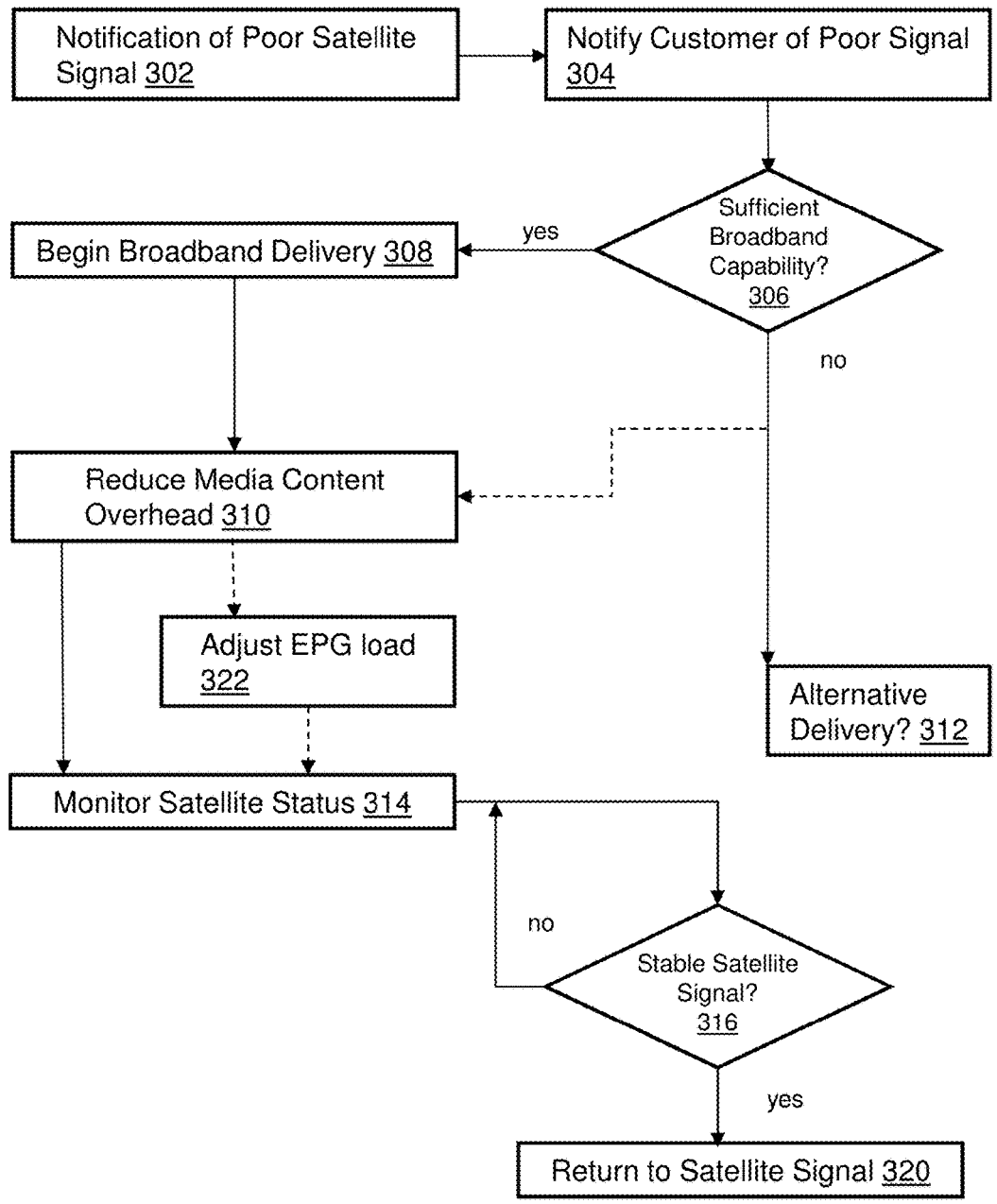
FIG. 3 depicts an illustrative embodiment of a method used in portions of the system described in FIG. 1.

FIG. 3 depicts an illustrative embodiment of a method 300 used by adaptive satellite network 100. Method 300 can include steps to provide media content from the satellite service provider through an available Internet or cellular connection. In Step 302, a notification of a poor satellite signal can be provided. For example, when, in method 200, a monitored satellite signal is found to be below the acceptable threshold, the set top box can notify the satellite content provider of the disruption in the satellite signal. In some embodiments, the customer may also be provided with the notice of poor signal in Step 304.

Exemplarily, upon issuance of the poor satellite signal notification, Step 306 considers the available bandwidth of the Internet connection provided to the set top box. The poor satellite signal notification can be provided to the satellite service provider to alert the satellite service provider to begin providing a downloadable stream of missing media content. The broadband capability can be determined to be acceptable to provide streaming or downloaded media content from the satellite service provider through the Internet Service Provider.

Exemplarily, if sufficient broadband capability is not available, an alternative delivery method can be sought in Step 312. For example, a different network can be searched for. In other examples, different wireless connections can be explored. In other embodiments, a cellular connection can be established to provide additional bandwidth or a different download path for the media content. For example, the set top box can establish communications with nearby communications devices to utilize their respective Internet connections. In other embodiments, associated Internet of Thing (IoT) device can be queried to provide their available Internet connectivity.

In other embodiments, the media content can be supplied through other paths aside from a direct path from the video head end system of the satellite service provider. In other embodiments, the set top box of one subscriber can communicate with the set top box of another subscriber to retrieve the necessary media content. In this example, the neighboring set top box is still able to receive satellite signals to provide the media content and additional information contained in the satellite signal. In some examples, multiple functioning set top boxes can be networked together to provide a neighboring or networked set top box with the replacement media content. In other embodiments, the scheduled media content can be provided from an outside source that has a digital library that can be accessed to retrieve appropriate content, such as directly retrieving the media content from local stations, media provider websites and libraries, and a third party provider under contract with the satellite service provider.

Referring to FIG. 1, additional households 143 and 144 which also subscribe to the satellite service provider media system 110 can likewise receive satellite signals 112 at their set top boxes 152 and 154. In this example, households 140 and 142 are in a similar geographic region 156 while household 144 can be remote from the geographic region. Nonetheless, household 144 can communicate with household 140 via a link 154. Similarly, household 142 can communicate with household 140 via a link 158. Similarly, any number of households can communicate via their set top boxes as necessary to communicate media content between the set top boxes. In some examples, the replacement media content or scheduled media content can be provided from other household's set top boxes or through an Internet connection.

In another instance, if sufficient broadband capability is not available, method 300 can proceed to Step 310 in which the media content overhead being provided over the network can be reduced. In some examples, the load can be reduced by eliminating or curtailing additional media content services, such as an electronic programming guide, as illustrated in Step 322. In other embodiments, the resolution for the media content can be adjusted so as to require less bandwidth.

In some examples, the area affected by a weather based event can be quite large. Accordingly, the number of satellite service subscribers affected by the weather based event can likewise be quite large. Accordingly, the strain on an area's broadband provider, or Internet Service Providers, can be quite large. In some embodiments, the load can be reduced by providing replacement content at a reduced resolution or frame rate. In addition, extra bandwidth in the satellite service provider's signal can be filled with additional information, such as an electronic programming guide or dynamic advertisement insertion. In some embodiments, this additional information can be reduced or eliminated to reduce the load.

Next, in Step 314, the satellite signal can be further monitored to determine when the quality of the satellite signal returns to greater than the acceptable signal threshold. Step 316 can determine if the return to greater than the acceptable signal threshold is in accordance with an acceptable stability for the satellite signal. In some instances, a weather event may fluctuate in severity. Accordingly, in some embodiments, the stability of the satellite signal may be measured for a predetermined period of time to ensure that the return to a full satellite signal delivery, as illustrated in Step 320, is permanent. In some embodiments, weather data from an appropriate website can be accessed to determine if the weather event is over.

In measuring the stability of the satellite signal, the occurrences of "flip-flopping" between satellite signals and Internet delivery of media content should be avoided. In some instances, "flip-flopping" is avoided by measuring the availability of the satellite signal for a predetermined amount of time. In some examples, the system may wait for at least a full minute of stable satellite signals before returning back to full delivery of satellite based media content.

While for purposes of simplicity of explanation, the respective processes are shown and described as a series of blocks in FIGS. 2 and 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
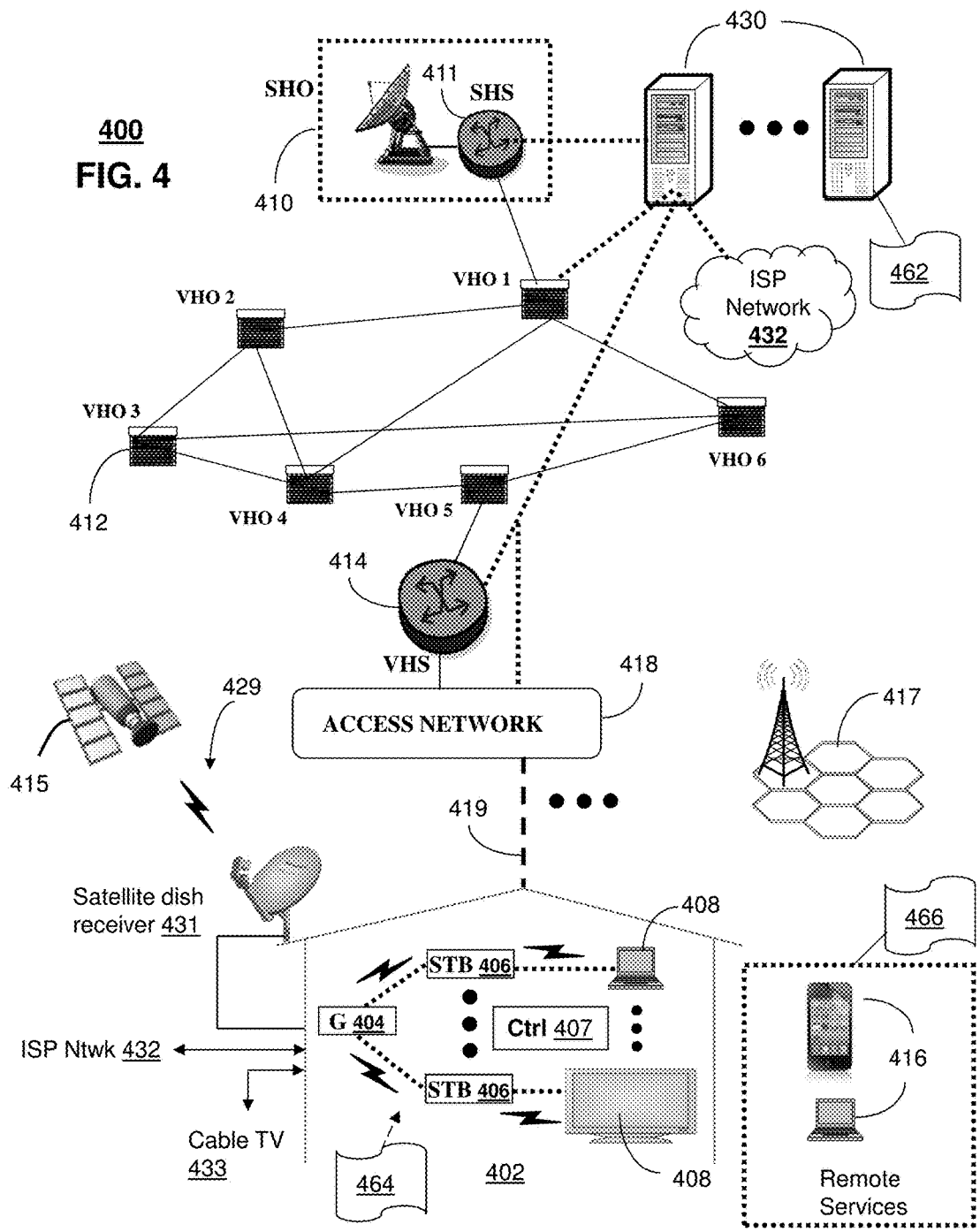
FIG. 4 depict illustrative embodiments of communication systems that provide media services through the satellite system 100 of FIG. 1.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with adaptive satellite network 100 of FIG. 1 as another representative embodiment of communication system 400. For instance, one or more devices illustrated in the communication system 400 of FIG. 4 can perform a method that includes receiving, by a processing system including a processor, satellite signal, measuring, by the processing system, a quality of the satellite signal, determining, by the processing system, whether the quality of the satellite signal falls below a threshold, determining, by the processing system, a channel of the satellite signal being viewed responsive to determining the quality of the satellite signal falls below the threshold, obtaining, by the processing system, the channel through a network connection as a replacement channel responsive to determining the quality of the satellite signal falls below the threshold, presenting, by the processing system, the replacement channel in place of the channel from the satellite signal, monitoring, by the processing system, the quality of the satellite signal during the presenting of the replacement channel, and presenting, by the processing system, the channel from the satellite signal responsive to the monitoring detecting a satisfactory quality of the satellite signal over a predetermined period of time.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an adaptive satellite based content provider (herein referred to as adaptive satellite based content provider server 430). The adaptive satellite based content provider server 430 can use computing and communication technology to perform function 462, which can include among other things, method 200 of FIG. 2. For instance, function 462 of server 430 can be similar to the functions described by the satellite service provider 120 in FIG. 1. The media processors 406 and wireless communication devices 416 can be provisioned with software functions 464 and 466, respectively, to utilize the services of adaptive satellite based content provider server 430. For instance, functions 464 and 466 of media processors 406 and wireless communication devices 416 can be similar to the functions described for the communication devices such as set top box 150 and cellular devices 130 of FIG. 1 in accordance with methods 200 and 300 of FIGS. 2 and 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
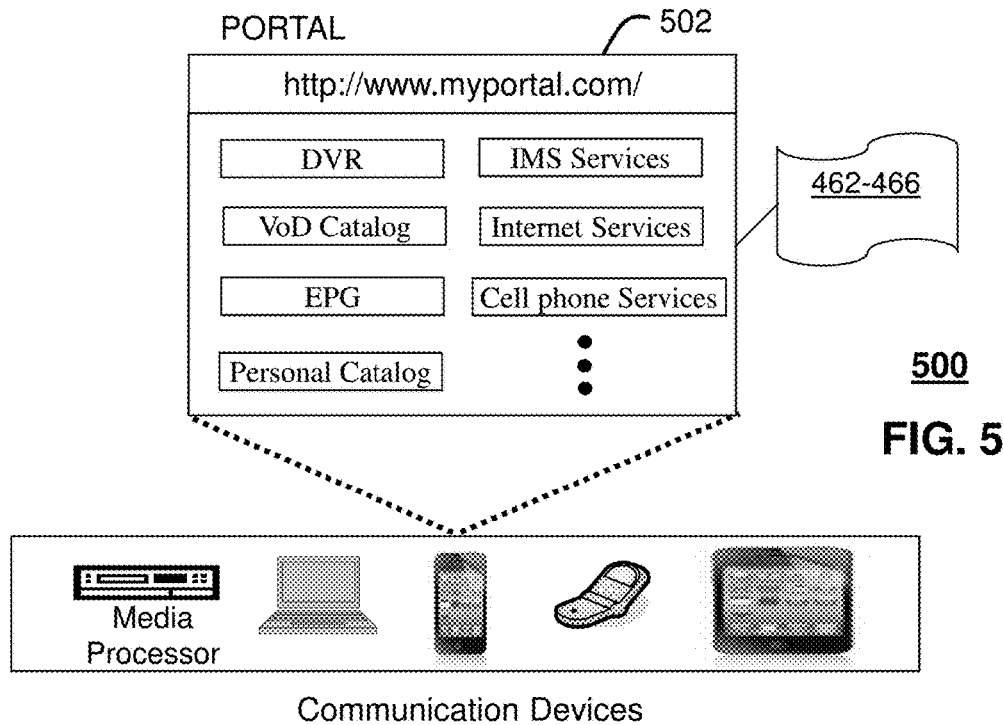
FIG. 5 depicts an illustrative embodiment of a web portal for interacting with the communication systems of the satellite system 100 of FIG. 1.

FIG. 5 depicts an illustrative embodiment of a web portal 502 of a communication system 500. Communication system 500 can be overlaid or operably coupled with system 100 of FIG. 1 and/or communication system 400 as another representative embodiment of system 100 of FIG. 1 and/or communication system 400. The web portal 502 can be used for managing services of system 100 of FIG. 1 and communication systems 400. A web page of the web portal 502 can be accessed by a Uniform Resource Locator (URL) with an Internet browser using an Internet-capable communication device such as those described in system 100 of FIG. 1 and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 464 and 466 to adapt these applications as may be desired by subscribers and/or service providers of system 100 of FIG. 1 and communication system 400. For instance, users of the services provided by adaptive satellite based content provider server 430 can log into their on-line accounts and provision the servers 120 or server 430 with the ability to set which wireless network or cellular network to long on to and for how long and so on. Service providers can log onto an administrator account to provision, monitor and/or maintain the system 100 of FIG. 1 or server 430.

Figure 6:
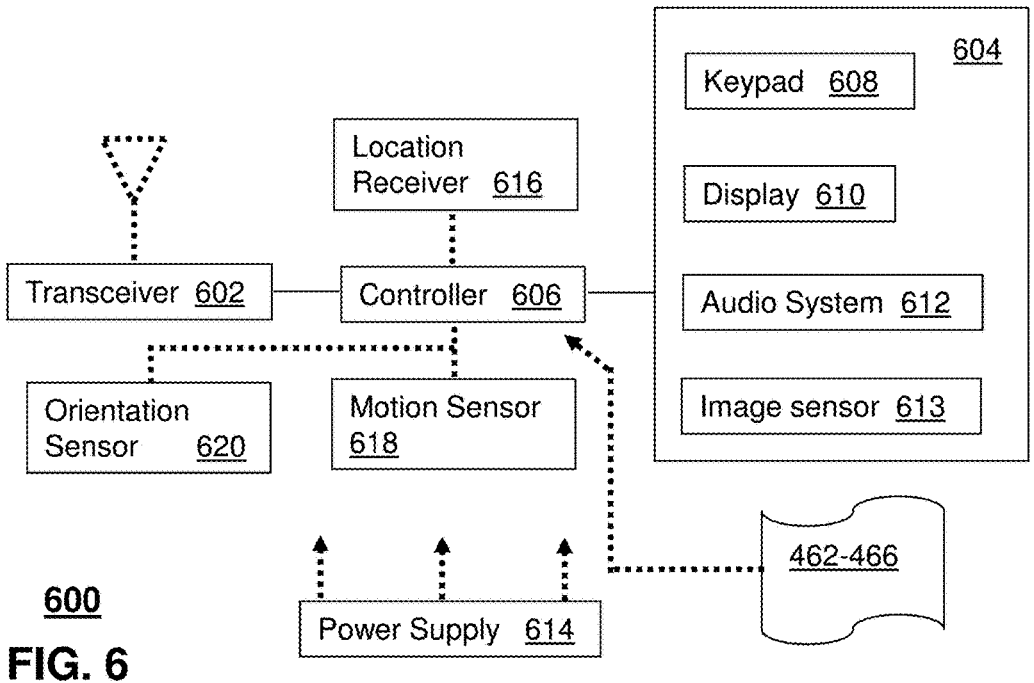
FIG. 6 depicts an illustrative embodiment of a communication device.

FIG. 6 depicts an illustrative embodiment of a communication device 600. Communication device 600 can serve in whole or in part as an illustrative embodiment of the devices depicted in system 100 of FIG. 1 and FIG. 4 and can be configured to perform portions of methods 200 and 300 of FIGS. 2 and 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of cellular device 130 of FIG. 1, the media processor 406, the media devices 408, or the portable communication devices 416 of FIG. 4. It will be appreciated that the communication device 600 can also represent other devices that can operate in system 100 of FIG. 1 and communication system 400 of FIG. 4 such as a gaming console and a media player. In addition, the controller 606 can be adapted in various embodiments to perform the functions 464, 462, and 466, respectively.

Upon reviewing the aforementioned embodiments, it would be evident to an artisan with ordinary skill in the art that said embodiments can be modified, reduced, or enhanced without departing from the scope of the claims described below. For example, exemplary embodiments can provide offers for additional broadband packages or subscriptions to ensure that the media content can be delivered without increased billing to the client. In other embodiments, the client can be notified of the satellite signal outage and also of the status of the Internet connection. For example, a graphical user interface can notify the user of current download speed, usage of available download capabilities, as well as weather reports for the area to indicate predictions of when satellite signal connectivity should resume. In other embodiments, the notification can also include a notice that increased broadband capacity is being temporarily provided during the satellite signal outage. In other embodiments, the system can organize an increase in sever capacity to ensure sufficient bandwidth is available for satellite subscribers in a geographic area affected by a condition that would impact reception of the satellite signals. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
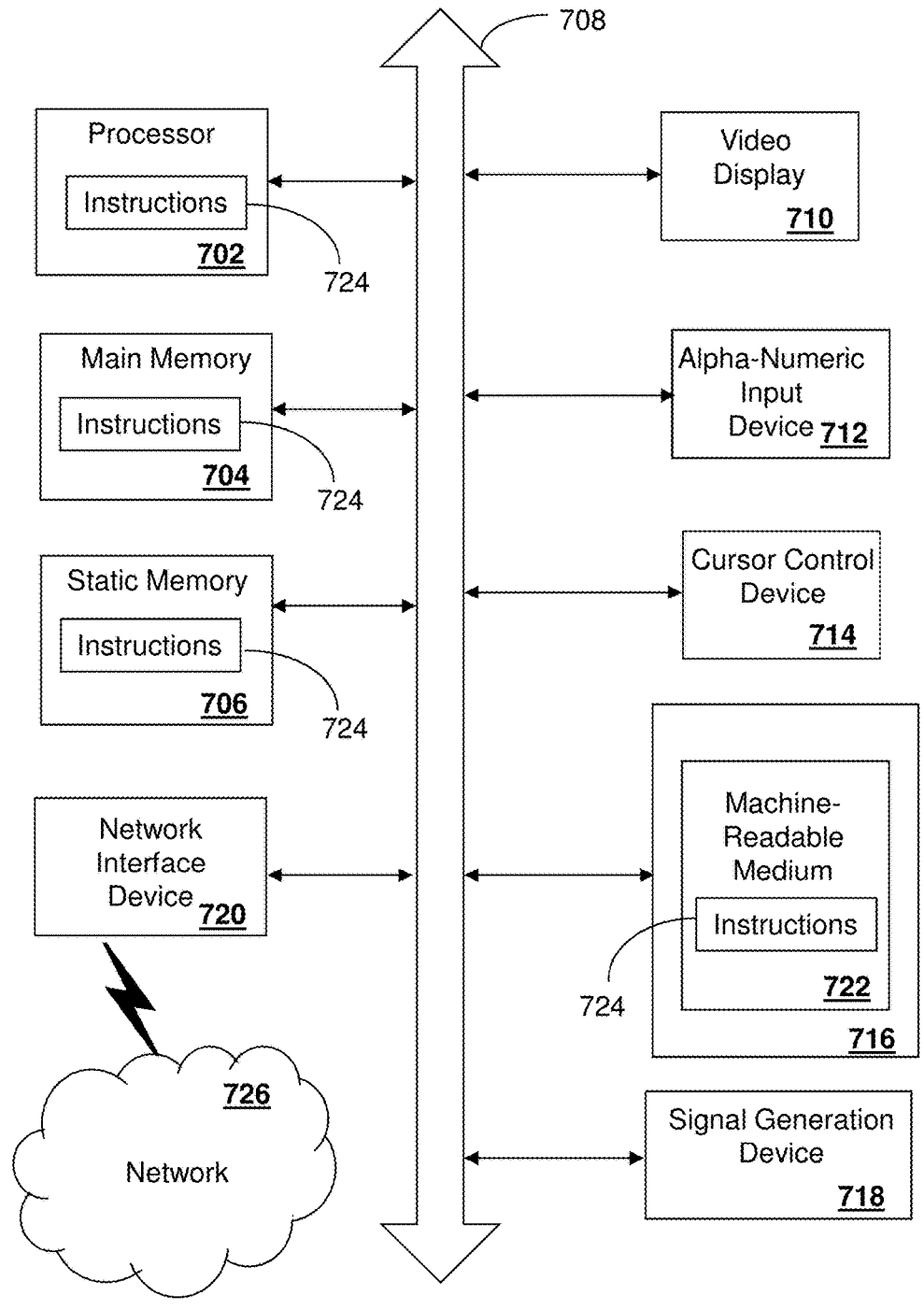
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the adaptive satellite based content provider server 430, the media processor 406, the set top box 150 and other devices of FIGS. 1 and 4. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

receiving, by a processing system including a processor, a satellite signal;

measuring, by the processing system, a quality of the satellite signal;

determining, by the processing system, whether the quality of the satellite signal falls below a threshold;

determining, by the processing system, a scheduled content of a channel of the satellite signal being viewed responsive to determining the quality of the satellite signal falls below the threshold;

detecting, by the processing system, a first available bandwidth for a cellular network and detecting, by the processing system, a second available bandwidth for a broadband network;

obtaining, by the processing system, the scheduled content through the cellular network as a replacement scheduled content responsive to determining the quality of the satellite signal falls below the threshold, responsive to determining the first available bandwidth is sufficient to carry the replacement scheduled content, and responsive to determining the second available bandwidth is not sufficient to carry the replacement scheduled content;
presenting, by the processing system, the replacement scheduled content through the cellular network in place of the scheduled content from the satellite signal;
providing, by the processing system, a notice that the satellite signal has been interrupted and that increased network capacity is being temporarily provided while the quality of the satellite signal is below the threshold;
monitoring, by the processing system, the quality of the satellite signal during the presenting of the replacement scheduled content; and
responsive to detecting a satisfactory quality of the satellite signal, presenting, by the processing system, the scheduled content from the satellite signal.

2. The method of claim 1, wherein the obtaining the scheduled content through the cellular network comprises determining a media content quality for the scheduled content based on first available bandwidth of the cellular network.

3. The method of claim 2, further comprising adjusting a quality of the replacement scheduled content according to the media content quality.

4. The method of claim 1, wherein the broadband network comprises a wireless network.

5. The method of claim 1, wherein the cellular network comprises an Internet connection.

6. The method of claim 1, further comprising deactivating viewing features while presenting the replacement scheduled content.

7. The method of claim 6, wherein the viewing features include an electronic programming guide for the satellite signal.

8. The method of claim 1, further comprising:
determining whether a relationship between a provider of the satellite signal and a provider of the cellular network includes a billing arrangement; and
reducing a billing rate for the cellular network responsive to determining the relationship between the provider of the satellite signal and the provider of the cellular network includes a billing arrangement during the obtaining the scheduled content through the cellular network.

9. The method of claim 1, wherein the presenting the scheduled content from the satellite signal comprises determining that the quality of the satellite signal will stay above the threshold for a second predetermined period of time.

10. A media processor, comprising:
a processing system including a processor; and
a memory that stores executable instructions that, when executed by the processing system, facilitate performance of operations, comprising:
receiving a satellite signal that includes media content;
presenting scheduled content from the satellite signal on a display device;
identifying a scheduled content identity for the scheduled content;
identifying replacement scheduled content for the scheduled content available through one of a cellular network and a broadband network;
monitoring a quality of the scheduled content as provided by the satellite signal;
determining the quality of the scheduled content is below a minimum quality threshold;
detecting a first available bandwidth for the cellular network and detecting a second available bandwidth for the broadband network;
obtaining the replacement scheduled content through the cellular network responsive to determining the quality of the satellite signal is below the minimum quality threshold, responsive to being notified that terms of service with respect to the cellular network are being modified while the quality of the satellite signal is below the minimum quality threshold, responsive to determining the first available bandwidth is sufficient to carry the replacement scheduled content, and responsive to the second available bandwidth is not sufficient to carry the replacement scheduled content;
presenting the replacement scheduled content in place of the scheduled content from the satellite signal on the display device while the quality of the scheduled content is below the minimum quality threshold; and
presenting the scheduled content from the satellite signal responsive to receiving a satisfactory weather report.

11. The media processor of claim 10, wherein the operations further comprise adjusting a quality of the replacement scheduled content according to a quality of the cellular network.

12. The media processor of claim 11, wherein the adjusting the quality of the replacement scheduled content includes adjusting a resolution of the replacement scheduled content.

13. The media processor of claim 10, wherein the operations further comprise removing an electronic programming guide capability during the presentation of the replacement scheduled content.

14. A non-transitory machine-readable storage medium, comprising executable instructions that, when executed by a processing system including a processor, facilitate performance of operations, comprising:
providing a satellite signal that includes media content to a media processor, wherein the satellite signal includes a plurality of channels containing media content and electronic programming guide information;
receiving an indication that a channel of the plurality of channels is being accessed by the media processor;
identifying scheduled content identity for the channel;
identifying replacement scheduled content for the channel available through one of a cellular network and a broadband network;
monitoring a quality of the channel from which the media processor receives the satellite signal;
determining the quality of the channel is below a minimum channel quality threshold;
detecting a first available bandwidth for the cellular network and detecting a second available bandwidth for the broadband network;
modifying terms of service of the cellular network and providing the replacement scheduled content through the cellular network responsive to determining the quality of the channel is below the minimum channel quality threshold, responsive to determining the first available bandwidth is sufficient to carry the replacement scheduled content, and responsive to the second available bandwidth is not sufficient to carry the replacement scheduled content, wherein the media processor presents the replacement scheduled content in place of the scheduled content from the satellite signal while the quality of the channel is below the minimum channel quality threshold; and increasing a capability of the cellular network during the providing the replacement scheduled content.

15. The non-transitory machine-readable storage medium of claim 14, wherein the operations further comprise:

monitoring the quality of the scheduled content from the satellite signal during the providing of the replacement scheduled content; and ceasing the providing the replacement scheduled content through the cellular network responsive to determining that the quality of the channel from the satellite signal is above a minimum restore satellite signal threshold over a predetermined period of time.

16. The non-transitory machine-readable storage medium of claim 14, wherein the operations further comprise adjusting a quality of the replacement scheduled content according to a quality of the cellular network.

17. The non-transitory machine-readable storage medium of claim 16, wherein the adjusting the quality of the replacement scheduled content includes adjusting a resolution of the replacement scheduled content.

18. The non-transitory machine-readable storage medium of claim 14, wherein the operations further comprise removing the electronic programming guide during the providing the replacement scheduled content through the cellular network.

19. The non-transitory machine-readable storage medium of claim 14, wherein the operations further comprise reducing a billing rate for the cellular network during the providing the replacement scheduled content through the cellular network.

20. The non-transitory machine-readable storage medium of claim 14, wherein the operations further comprise ceasing the providing the replacement scheduled content through the cellular network responsive to receiving a satisfactory weather report.

\* \* \* \* \*